United States Patent
Guo

(10) Patent No.: US 11,287,866 B2
(45) Date of Patent: Mar. 29, 2022

(54) COMPUTING DEVICE, POWER CONSUMPTION PREDICTION METHOD THEREOF AND NON-TRANSITORY COMPUTER-READABLE STORAGE MEDIUM

(71) Applicant: Shanghai Zhaoxin Semiconductor Co., Ltd., Shanghai (CN)

(72) Inventor: Xiaoni Guo, Fremont, CA (US)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 370 days.

(21) Appl. No.: 16/398,267

(22) Filed: Apr. 30, 2019

(65) Prior Publication Data

US 2020/0348739 A1 Nov. 5, 2020

(51) Int. Cl.
*G06F 1/28* (2006.01)
*G06T 1/20* (2006.01)
*G06F 1/324* (2019.01)
*H02J 3/00* (2006.01)
*G06F 1/3296* (2019.01)

(52) U.S. Cl.
CPC ............. *G06F 1/28* (2013.01); *G06F 1/324* (2013.01); *G06T 1/20* (2013.01); *G06F 1/3296* (2013.01); *H02J 3/003* (2020.01); *Y02D 10/00* (2018.01)

(58) Field of Classification Search
CPC .......... G06F 1/28; G06F 1/324; G06F 1/3296; H02J 3/003; Y02D 10/00; H03J 3/003; G06T 1/20
See application file for complete search history.

(56) References Cited

U.S. PATENT DOCUMENTS

| | | | |
|---|---|---|---|
| 8,924,752 B1 * | 12/2014 | Law | G06F 1/3265 713/322 |
| 2017/0199542 A1 * | 7/2017 | Sylvester | G06T 1/20 |
| 2018/0039317 A1 * | 2/2018 | Riguer | G09G 5/363 |

\* cited by examiner

*Primary Examiner* — Terrell S Johnson
(74) *Attorney, Agent, or Firm* — JCIPRNET

(57) ABSTRACT

A computing device, a power consumption prediction method thereof, and a non-transitory computer-readable storage medium are provided. In one embodiment, leakage power consumption of a graphics processor is obtained. Switching power consumption data corresponding to the graphics processor running a frame of image is obtained. Switching power consumption is estimated according to the switching power consumption data. Overall power consumption of the graphics processor is obtained according to the leakage power and the switching power consumption. Overall power consumption of the graphics processor processing one frame of image is estimated based on the overall power consumption. Power consumption performance of the graphics processor is therefore predicted in real-time.

21 Claims, 3 Drawing Sheets

COMPUTING DEVICE, POWER CONSUMPTION PREDICTION METHOD THEREOF AND NON-TRANSITORY COMPUTER-READABLE STORAGE MEDIUM

BACKGROUND

Technical Field

The disclosure relates to power consumption and performance evaluation, and particularly relates to a computing device, a power consumption prediction method thereof, and a non-transitory computer-readable storage medium.

Description of Related Art

Power consumption is one of the important factors for evaluating performance of a processor (for example, a Central Processing Unit (CPU), a Graphics Processing Unit (GPU), a Digital Signal Processor (DSP), etc.). As is known to all, power consumption may be obtained through multiplying voltage by current. However, the current data of analog signals can't be tracked or detected in real-time, so obviously, power consumption data obtained through power meters are not real-time.

FIG. 1 is a flowchart of an existing method for adjusting power consumption and other performance. For example, the device being adjusted is a smart phone, and in step S110, running a program in the smart phone. In step S120, through a simulation test manner, obtaining other performance data of the smart phone. In step S130, connecting a power meter to the smart phone to obtain the power consumption of the smart phone. In step S140, analyzing the other performance data and the power consumption. In step S150, determining whether the performance data of the smart phone, including the power consumption and the other performance data, meets predetermined threshold requirements or satisfies a specific standard. If the performance is not complied with the predetermined threshold requirements or does not satisfy the specific standard, an engineer has to modify program codes or parameters to repeat the aforementioned step S110 to step S150 until the performance is complied with the predetermined threshold requirements or satisfies the specific standard.

It should be noted that, in an actual running process, the magnitude of the real-time current cannot be obtained. The power consumption fed back by the power meter is not real-time, the engineer cannot dynamically adjust the power consumption and has to repeat the aforementioned step S110 to step S150 frequently to balance the relationship between power consumption and other performance data, such that the whole procedure of power consumption adjusting is rather lengthy. On the other hand, most of manufacturers of the adjusted devices generally adjust power consumption according to switching among applications or scenes, however, such adjusting method is generally too simple and rough.

SUMMARY

The disclosure is directed to a computing device, a power consumption prediction method thereof, and a non-transitory computer-readable storage medium, where overall power consumption is estimated based on a single frame, so as to provide a more flexible and real-time adjusting method.

An embodiment of the disclosure provides a power consumption prediction method adapted to predict power consumption of a graphics processor, and the power consumption prediction method includes the following steps. Obtaining leakage power consumption of the graphics processor. Obtaining switching power consumption data corresponding to the graphics processor running one frame. Estimating switching power consumption of the graphics processor according to a switching power consumption data. Moreover, obtaining overall power consumption of the graphics processor running the frame according to the leakage power consumption and the switching power consumption.

An embodiment of the disclosure provides a computing device adapted to predict power consumption of a graphics processor. The computing device includes a processor, so as to obtain leakage power consumption of the graphics processor and switching power consumption data corresponding to the graphics processor running one frame, estimate switching power consumption according to the switching power consumption data, and obtain overall power consumption of the graphics processor according to the leakage power consumption and the switching power consumption.

An embodiment of the disclosure provides a computer-readable storage medium storing a computer program, and the computer program is executed by a processor to implement following steps. Obtaining leakage power consumption of a graphics processor. Obtaining switching power consumption data corresponding to the graphics processor running one frame. Estimating switching power consumption according to the switching power consumption data. Further, obtaining overall power consumption of the graphics processor according to the leakage power consumption and the switching power consumption.

In the embodiments of the disclosure, the overall power consumption is estimated based on single frame, the power consumption is predicted in real-time, and efficiency of the adjusting procedure is effectively improved. The overall power consumption of the processor includes the leakage power consumption and the switching power consumption. Regarding the switching power consumption, the embodiments of the disclosure take a comprehensive consideration of various factors including signal toggle rate, the logic gate number, the voltage, the frequency, the number of signal toggles, the switching power consumption per gate pre transition, etc., to obtain a result that is closer to an actual situation.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
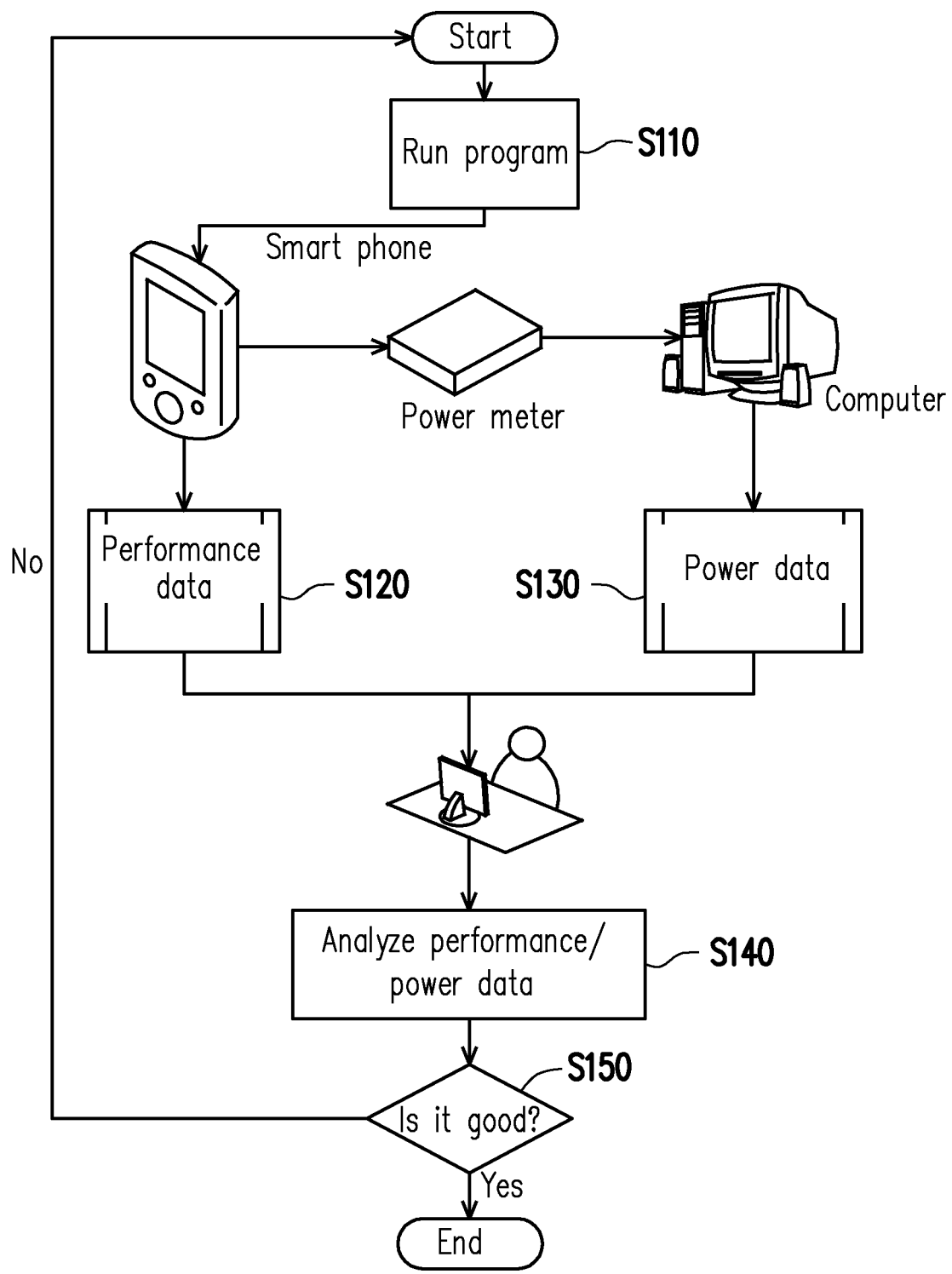
FIG. 1 is a flowchart of an existing method for adjusting power consumption and other performance.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
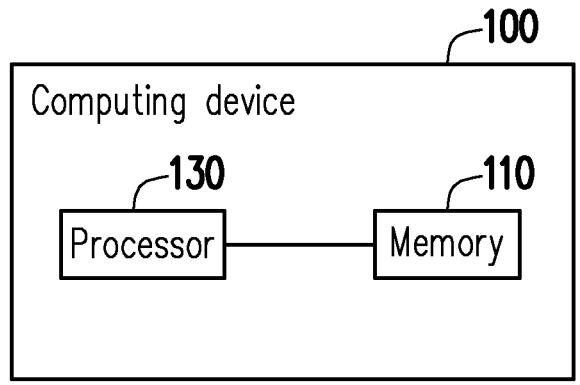
FIG. 2 is a device block diagram of a computing device according to an embodiment of the disclosure.

FIG. 2 is a device block diagram of a computing device 100 according to an embodiment of the disclosure. Referring to FIG. 2, the computing device 100 may be an electronic device such as a smart phone, a tablet Personal Computer (PC), a notebook, a desktop computer, etc. The computing device 100 comprises but not limited to a memory 110 and a processor 130.

The memory 110 may be any type of a fixed or movable Random Access Memory (RAM), a Read-Only Memory (ROM), a flash memory or a similar device or a combination of the above devices. The memory 160 records program codes, device configurations, buffered or permanent data (for example, power consumption data, a frequency-voltage mapping table, a total number of hardware modules, a logic gate number in each of the hardware modules, etc.), software modules, applications, etc.

The processor 130 is coupled to the memory 110 and has multiple hardware modules. The processor 130 is configured to process signals and execute programs of the exemplary embodiments of the disclosure, and may access or load data recorded by the memory 110 and the software modules recorded by the memory 110. The functions of the processor 130 may be implemented by using a programmable unit such as a Central Processing Unit (CPU), a graphics processor (i.e., Graphics processing unit (GPU)), a microprocessor, a micro-controller, a Digital Signal Processor (DSP) chip, a Field Programmable Gate Array (FPGA), etc. The functions of the processor 130 may also be implemented by using an independent electronic device or an integrated circuit (IC), and operations of the processor 130 may also be implemented by software. In an embodiment, the processor 130 is used for predicting a power consumption of the graphics processor, and hardware modules included in the graphics processor may include, but not limited to, one of an Execution Unit (EU), a Triangle Set-up Unit (TSU), a Memory Access Unit (MXU), a Texturing Unit (FF), a Tile Span Generator (TU), and etc., or any combination of the foregoing. It should be noted that in other embodiments, the hardware modules included in the graphics processor may also comprise a compiler, or a buffer unit, and etc., which may be adjusted by the user according to an actual requirement. According to an embodiment of the disclosure, calculation may be performed by the processor 130 which is not the graphics processor in the computing device 100, and in other embodiments, the processor 130 is a graphics processor and may be used to calculate overall power consumption of itself, which is not limited by the disclosure.

To facilitate understanding of the operation flow of the embodiments of the disclosure, multiple embodiments are provided below to describe the operation flow of the computing device 100 of the disclosure.

Figure 3:
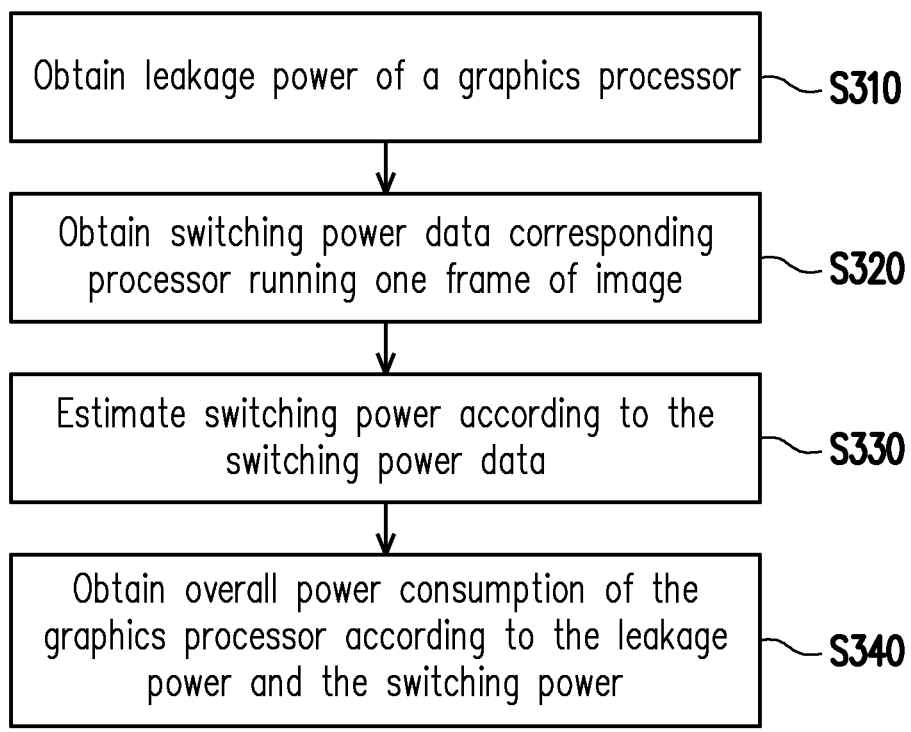
FIG. 3 is a flowchart illustrating a power consumption prediction method according to an embodiment of the disclosure.

FIG. 3 is a flowchart illustrating a power consumption prediction method according to an embodiment of the disclosure. Referring to FIG. 3, the method of the embodiment is adapted to the computing device 100 of FIG. 2. In the following description, the method of the embodiment of the disclosure is described with reference of various components of the computing device 100. Various steps of the method may be adjusted according to an actual situation, which are not limited by the disclosure.

In step S310, leakage power consumption of the graphics processor is obtained through the processor 130. In an embodiment, the leakage power consumption of the graphics processor is obtained through a power meter, wherein the leakage power consumption of the graphics processor is under one operating voltage and one operating frequency. Both of the operating voltage and the operating frequency may have one or a plurality of pre-determined values, wherein one leakage power consumption value corresponds to one operating voltage value and one operating frequency value. Such data may be pre-stored in the memory 110 or may be obtained through a communication processor (for example, WiFi, Ethernet, etc.), various types of transmission interfaces (for example, USB, etc.), or an input device (for example, a keyboard, a mouse, etc.), such that the processor 130 may obtain the operating voltage, the operating frequency, and the corresponding leakage power consumption through a table look-up manner or by sending a request. The "leakage power consumption", the "switching power consumption", and "total power consumption" in the specification refer to the leakage power consumption, the switching power consumption, and the total power consumption of the graphics processor.

In another embodiment, since the operating voltages and the operating frequencies are pre-determined, the processor 130 may directly inquire and obtain the corresponding leakage power consumption from the memory 110 or an external source (for example, a network, a storage card, a power meter etc.) as well.

It should be noted that if one operating frequency corresponds to more than one operating voltage, and/or one operating voltage corresponds to more than one operating frequency, actually the processor 130 needs to obtain different leakage power consumption according to all combinations generated by each of the operating voltages and each of the operating frequencies.

The processor 130 is required to mark off multiple timing intervals, hereinafter intervals, according to different operating voltages and different operating frequencies. The operating voltage and the operating frequency used in the same interval are fixed, so that switching power consumption generated under one of the operating voltages and one of the operating frequencies corresponding to one interval is calculated. When an operating voltage variation or an operating frequency variation is detected, the processor 130 determines to enter next interval, so as to calculate the switching power consumption in the next interval, and sum the switching power consumption corresponding to all of the intervals to obtain total power consumption of the graphics processor calculated by the processor 130. Therefore, if a single operating voltage or a single operating frequency is given, the processor 130 calculates and takes the switching power consumption corresponding to the single operating voltage as the finally estimated total switching power consumption, or calculates and takes the switching power consumption corresponding to the single operating frequency as the finally estimated total switching power consumption.

Specifically, in step S320, the processor 130 obtains switching power consumption data corresponding to running or processing a single frame. The overall power consumption of the graphics processor comprises the leakage power consumption and the switching power consumption. The switching power consumption refers to power consumption generated by turning on/off variations of logic gates in the graphics processor, so that the switching power consumption is actually dynamically changed. In the embodiment of the disclosure, the switching power consumption is estimated based on single frames, and the switching power consumption is an important reference for estimating the total power consumption. The switching power consumption data is required for estimating the switching power consumption based on the single frames. According to the embodiments of the disclosure, the switching power consumption data may include but not limited to a total number of logic gates on a hardware module, a signal toggle rate, i.e. toggle times of signals in a unit interval, wherein the toggle refers to the signals flip from high level to low level or flip from low level to high level, and the signals control the logic gates on the hardware module to turn on/off, a count to the signal toggle numbers on the hardware module, the switching power consumption per gate per transition (SPPGT), a clock cycle number consumed by the signal toggle count, an operating voltage when the SPPGT is generated (also called as a unit voltage), a number of the hardware modules included in the graphics processor, etc. The switching power consumption data may be obtained through looking up table(s) of the memory 110 or through an external source, and detail thereof is described later.

In step S330, the processor 130 estimates switching power consumption required for processing one frame according to the switching power consumption data. A mathematical expression thereof is as follow:

$$SP_m = \Sigma_{m=1}^{n} Load_m / T_m * Area_m * TR_m * Freq * V^2 / V_g^2 * SPPGT \quad (1)$$

Herein, $SP_m$ is switching power consumption required by all hardware modules included in the graphics processor for processing one frame in an interval corresponding to an operating voltage V and an operating frequency Freq, n is a total number of the hardware modules in the graphics processor, m represents an $m^{th}$ hardware module, $Load_m$ is the signal toggle count on the $m^{th}$ hardware module when the graphics processor processes the frame, $T_m$ is a clock cycles' number consumed when generating the count $Load_m$ and is called as a time stamp as well, $Area_m$ is a total number of logic gates on the $m^{th}$ hardware module, $TR_m$ is a signal toggle rate of the signals on the $m^{th}$ hardware module, V is the operating voltage, Freq is the operating frequency, and $V_g$ is an operating voltage required to be applied to the graphics processor to obtain the switching power consumption per gate pre transition SPPGT and is called as a unit voltage as well. According to an embodiment of disclosure, the unit voltage may be but not limited to 1V. SPPGT is the switching power consumption generated by a single logic gate operated under the unit voltage for implementing on/off once on the $m^{th}$ hardware module and is called as the switching power consumption per gate pre transition as well.

When the graphics processor is processing a frame of image or video, the signal toggle rates of the signals on the $m^{th}$ hardware module change quickly most of the time. Nevertheless, an average value of the signal toggle rates of the signals on the $m^{th}$ hardware module is relatively stable among different frames. Therefore, one or a few frames may be selected as a sample frame(s) to obtain an average signal toggle rate to act as the signal toggle rate $TR_m$ of the signals on the $m^{th}$ hardware module. In an embodiment, the processor 130 obtains the average signal toggle rate of the $m^{th}$ hardware module through running the sample frame(s) on a simulation machine. In another embodiment, the processor 130 runs the sample frame(s) on a target machine, meantime the processor 130 obtains or measures total power consumption of the graphics processor or the $m^{th}$ hardware module by a power meter, so as to calculate the average signal toggle rate of the $m^{th}$ hardware module, wherein the target machine is running under a specific operating voltage and a specific operating frequency. According to an embodiment of the disclosure, the average signal toggle rate $TR_m$ of the signals on the $m^{th}$ hardware module may be stored in a look-up table that may be looked up by the processor 130. In an embodiment of the disclosure, herein, the sample image(s) may comprise or not comprise the frame used for calculating the switching power consumption.

The processor 130 estimates the switching power consumption for running a frame in an interval according to the switching power consumption data. Herein, the switching power consumption is calculated according to the logic gates' toggle situation, the SPPGT and the unit voltage through the processor 130, wherein the logic gates' toggle situation is, $Area_m$ logic gates' on/off situation caused by the $Load_m$ times of signals' toggle with the signal toggle rate $TR_m$. According to an embodiment of the disclosure, the toggle situation refers state switching between turning on and turning off of a logic gate caused by a signal's toggle. That is, the logic gate is switched from a turning on state to a turning off state or is switched from the turning off state to the turning on state.

To be specific, if a given operating frequency corresponds to more than one operating voltage or a given operating voltage corresponds to more than one operating frequency, the process 130 may mark off multiple intervals according to a manner of one operating voltage corresponding to one operating frequency.

Figure 4:
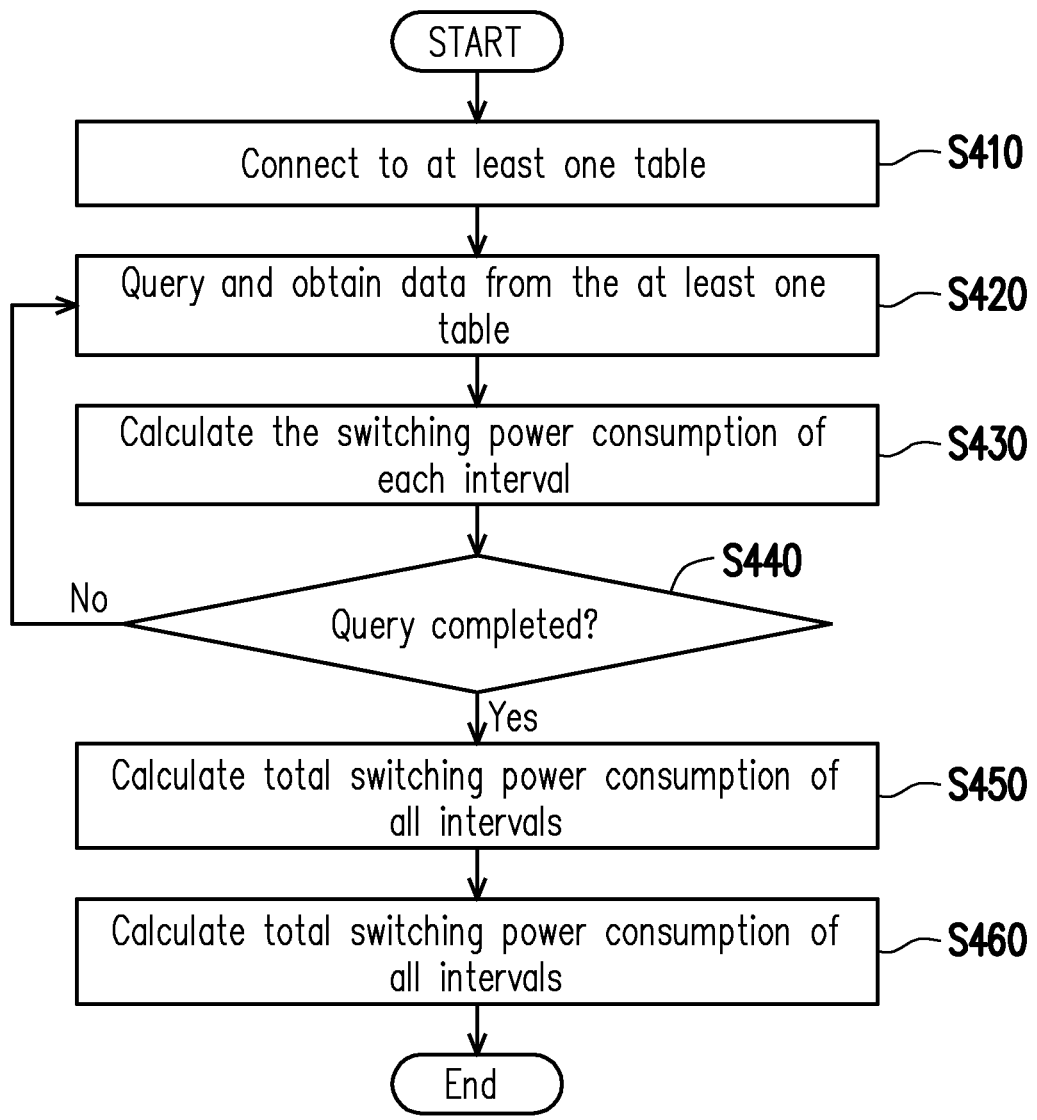
FIG. 4 is a flowchart illustrating a method for estimating switching power consumption according to an embodiment of the disclosure.

To be specific, as shown in the detailed flowchart of FIG. 4, in step S410, through the processor 130, connecting to at least one table.

In step S420, through the processor 130, obtaining data from the at least one table, wherein the data may comprising but not limited to the followings: the operating voltages, the operating frequencies, the leakage power consumption of the graphics processor corresponding to each of the operating voltages and each of the operating frequencies, the switching power consumption per gate pre transition, the count of hardware modules, the types of the hardware modules, the total number of logic gates on each of the hardware modules, the signal toggle rate on each of the hardware modules, the signal toggle count on each of the hardware modules, etc. According to one embodiment of the disclosure, as mentioned in step S310 of FIG. 3, in the step S420, the leakage power consumption under each operating voltage and each operating frequency of the graphics processor may also be inquired and obtained from the at least one table through the processor 130.

In step S430, the switching power consumption $SP_m$ of the hardware modules in the graphics processor under one operating voltage V and one operating frequency Freq is calculated first when one frame is processed through the processor 130. That is, the switching power consumption generated by a corresponding logic gates' toggle situation of each of the hardware modules in one interval is calculated and the switching power consumption generated by the corresponding logic gate toggle situations of all of the hardware modules is summed up.

In step S440, the processor 130 determines that whether an end of the at least one look-up table is reached and the processor 130 calculates the total power consumption of all intervals after it is ensured that the end of the at least one look-up table in reached. If the end of the at least one of the look-up table is not queried, repeat the step S420 and the S430, or proceed to next step S450.

In step S450, the total switching power consumption of all intervals is calculated by the processor 130, which is as the switching power consumption required by the graphics processor to process a frame. According to an embodiment of the disclosure, if a single voltage and a single frequency are pre-determined, the processor 130 takes the switching power consumption corresponding to the single interval as the finally estimated switching power consumption, so as to obtain overall power consumption. According to another embodiment of the disclosure, in step S430, the actual toggle number may also be converted into a standardized toggle count for calculation.

In step S460, through the processor 130, summing up the total switching power consumption of all intervals and the total leakage power consumption of all intervals to obtain the overall power consumption required for processing a frame for a graphics processor.

In an embodiment, the above steps S410~S460 illustrate the calculation method of the overall power consumption, but do not limit the number of the steps or the operations performed at each of the steps, for example, the steps S440~S460 may be directly combined into one.

The processor 130 obtains overall power consumption according to the leakage power obtained in the step S310 and the switching power estimated in the step S330 (step S340). In an embodiment, the overall power consumption SPi is a sum of the leakage power consumption of all intervals and the switching power consumption of all intervals, and a mathematical expression (2) thereof is as follow:

$$SP_i = (\Sigma_{i=1}^{N} LP_i * t_i + \Sigma_{i=1}^{N} SP_i * t_i)/\text{Time\_total} \quad (2)$$

Herein, $LP_i$ is leakage power consumption in an $i^{th}$ interval, N is the total number of the intervals, $t_i$ is a time length of the $i^{th}$ interval, Time_total is a total measurement time, that is, a sum time of the first interval to the $N^{th}$ interval.

In other embodiments, the leakage power consumption and the switching power consumption may be respectively assigned with a weight value, so the overall power consumption is obtained by being weighted and summed up, or factors of the overall power consumption may comprise a short-circuit power consumption, a surge power consumption, etc.

To fully convey the spirit of the disclosure, one exemplary embodiment is provided below, it should be noted that values used in the exemplary embodiment are used only for describing the exemplary embodiment and are not intended to limit the disclosure.

The exemplary embodiment shows estimation of the total power consumption of a graphics processor by the processor 130 through running a graphics-related benchmark program. It is assumed that the graphics processor includes five hardware modules TSU, FF, EU, TU, and MXU, and the switching power consumption data and the leakage power consumption of the graphics processor are as shown in tables (1) to (4) as follows. Herein, table (1) is a look-up table of the logic gate number and the signal toggle rate corresponding to each of the hardware modules included in the graphics processor. Table (2) is a look-up table of the operating voltage, the operating frequency, the leakage power consumption corresponding to the operating voltage and the operating frequency, and values of the switching power consumption per gate pre transition SPPGT of the graphics processor. Table (3) shows the actual toggle number of the signals in each of the hardware modules when the graphics processor processes a sample of each frame of image or video image and the finally calculated total power consumption. As shown in table (3), the exemplary embodiment specifically selects nine frames as sample frames for calculation. Table (4) shows the actual toggle number of the signals in each of the hardware modules when the graphics processor processes each of the sample frames and actually tested total power consumption.

TABLE (1)

| Hardware module name | TSG | FF | EU | TU | MXU |
|---|---|---|---|---|---|
| Logic gate number Area$_m$ | 736000 | 2172000 | 14496000 | 4352000 | 2065000 |
| Toggle rate TR$_m$ | 0.5 | 0.4 | 0.11 | 0.4 | 0.4 |

TABLE (2)

| Frequency Freq (MHz) | 202.5 | 300 | 405 |
|---|---|---|---|
| Voltage V (Volt) | 0.88 | 1 | 1.12 |
| Leakage power consumption LP$_i$ (Watt) | 0.0468 | 0.0927 | 0.0148 |
| SPPGT(W/Hz/gate) | | 8.84E−10 | |

TABLE (3)

| | Actual toggle number Load$_m$ | | | | | Time stamp T$_m$ | Estimated power consumption (Watt) |
|---|---|---|---|---|---|---|---|
| Frame | TSG | FF | EU | TU | MXU | | |
| 51 | 1305098 | 1955123 | 2073000 | 1941487 | 2409342 | 3146141 | 0.525 |
| 250 | 1977006 | 1472786 | 2615300 | 2247672 | 2096967 | 3630291 | 0.498 |
| 295 | 2309589 | 1907930 | 3199335 | 2774207 | 2609230 | 4339414 | 0.513 |
| 305 | 2169101 | 1869508 | 3301007 | 2919752 | 2489070 | 4180047 | 0.538 |
| 320 | 2169101 | 1869508 | 3301007 | 2779619 | 2825719 | 4348381 | 0.525 |
| 400 | 2222975 | 2026661 | 3299128 | 2454907 | 2163000 | 3481338 | 0.543 |
| 420 | 1549883 | 1664941 | 2745301 | 3358601 | 2843572 | 4446250 | 0.562 |
| 502 | 2916459 | 2353810 | 4830129 | 4144116 | 3074170 | 5949626 | 0.526 |
| 530 | 3982621 | 2633606 | 5890568 | 4850874 | 3664871 | 7304414 | 0.514 |

TABLE (4)

| Frame | Actual signal toggle count $Load_m$ | | | | | Time stamp $T_m$ | Tested power consumption (Watt) |
|---|---|---|---|---|---|---|---|
| | TSG | FF | EU | TU | MXU | | |
| 51  | 1305098 | 1955123 | 2073000 | 1941487 | 2409342 | 3146141 | 0.491169 |
| 250 | 1977006 | 1472786 | 2615300 | 2247672 | 2096967 | 3630291 | 0.470261 |
| 295 | 2309589 | 1907930 | 3199335 | 2774207 | 2609230 | 4339414 | 0.508649 |
| 305 | 2169101 | 1869508 | 3301007 | 2919752 | 2489070 | 4180047 | 0.526111 |
| 320 | 2169101 | 1869508 | 3301007 | 2779619 | 2825719 | 4348381 | 0.492772 |
| 400 | 2222975 | 2026661 | 3299128 | 2454907 | 2163000 | 3481338 | 0.524615 |
| 420 | 1549883 | 1664941 | 2745301 | 3358601 | 2843572 | 4446250 | 0.588777 |
| 502 | 2916459 | 2353810 | 4830129 | 4144116 | 3074170 | 5949626 | 0.60459 |
| 530 | 3982621 | 2633606 | 5890568 | 4850874 | 3664871 | 7304414 | 0.563799 |

According to the formula (1) and the tables (1) to (3), taking the $51^{th}$ frame as an example, the time stamps Tm corresponds to each of the hardware modules are identical, so that the processor 130 estimates switching power consumption generated by the frame of image first, and in an interval under an operating voltage of 0.88V and an operating frequency of 202.5 MHz, the switching power consumption is $$SP_m = \left(\sum_{m=1}^{n} Load_m * Area_m * TR_m\right) / T_m * Freq * V^2 / V_g^2 * SPPGT$$

$$(1305098 * 736000 * 0.5 + 1955123 * 2172000 * 0.4 +$$

$$2073000 * 14496000 * 0.11 + 19414$$

$$87 * 4352000 * 0.4 + 2409342 * 2065000 * 0.4) / 3146141 * 202.5 *$$

$$106 * 0.882 / 12 * 8.84 * 10^{-10}$$

$$= 0.4782W$$

According to formula (2), if the graphics processor keeps in the interval under the operating voltage of 0.88V and the single operating frequency of 202.5 MHz, the overall power consumption of the graphics processor processing one frame $SP_i$ equal to the switching power consumption plus a leakage voltage of 0.0468V under the operating voltage of 0.88V and the operating frequency of 202.5 MHz, which is 0.525 W.

By analogy, overall power consumption corresponding to other frames may be estimated through the processor 130.

An error between the estimated overall power consumption in the exemplary embodiment shown in table (3) and the actual power consumption of the exemplary embodiment shown in table (4) is around 10%. According to the embodiments of the disclosure, the error may actually be less than 4%.

According to another embodiment of the disclosure, when estimated power consumption in table (3) is calculated, the actual toggle number shown in table (3) may be standardized first. That is, the actual toggle number of $Load_m$ in table (3) is correspondingly divided by the value of the time stamp Tm and then multiplied by one thousand for calculation.

For example, according to the formula (1) and the tables (1) to (3), taking the $51^{th}$ frame as an example, the time stamps Tm corresponds to each of the hardware modules are identical, and in an interval under an operating voltage of 0.88V and an operating frequency of 202.5 MHz, the switching power consumption is:

$$SP_m = (415 * 736000 * 0.5 + 621 * 2172000 * 0.4 + 659 * 14496000 *$$

$$0.11 + 617 * 4352000 * 0.4 + 766 * 2065000 * 0.4) / 1000 *$$

$$202.5 * 0.88^2 / 12 * 8.84 * 10^{-10}$$

$$= 0.4782W$$

Moreover, the disclosure provides a non-transitory computer-readable storage medium (for example, a hard disk, a compact disk, a flash card, a Solid State Disk (SSD), etc.), and the non-transitory computer-readable storage medium may store multiple computer programs (for example, a leakage power consumption computer program, a power consumption data obtaining computer program, a switching power consumption estimation computer program, an overall power consumption computer program, etc.), and after these computer programs or program codes are loaded to the processor 130 of the computing device 100 and executed by the same, the aforementioned steps of the power consumption prediction method may be implemented.

In summary, in the embodiments of the disclosure, power consumption feedback may be obtained in real-time based on the single frame, such that an engineer may adjust the power consumption of a next frame in real-time according to the fed back power consumption, so as to form a self-adaptive system. Compared to the conventional adjusting method that requires the engineer to participate the whole course of the adjusting procedure, the embodiments of the disclosure may improve an overall efficiency.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A power consumption prediction method, adapted to predict power consumption of a graphics processor, and the power consumption prediction method comprising:
   obtaining leakage power consumption of the graphics processor;
   obtaining switching power consumption data corresponding to the graphics processor running one frame;
   estimating switching power consumption of the graphics processor according to the switching power consumption data; and
   obtaining overall power consumption of the graphics processor running the frame according to the leakage power consumption and the switching power consumption.

2. The power consumption prediction method as claimed in claim 1, wherein the step of estimating the switching power consumption of the graphics processor according to the switching power consumption data comprises:

the switching power consumption data corresponds to a logic gate toggle situation reflected by the graphics processor running the frame under an operating voltage and an operating frequency.

3. The power consumption prediction method as claimed in claim 2, wherein the switching power consumption data comprises a signal toggle rate, a logic gate number, and a signal toggle count, and the logic gate toggle situation refers to a toggle situation that the logic gates of the logic gate number implement the signal toggle count times of turning on/off with the signal toggle rate.

4. The power consumption prediction method as claimed in claim 2, wherein the step of estimating the switching power consumption according to the switching power consumption data comprises:

marking off a plurality of intervals according to the operating voltages and the operating frequencies;

respectively calculating the switching power consumption generated by corresponding logic gate toggle situation within each of the intervals; and summing up the switching power consumption generated by corresponding logic gate toggle situations of all of the intervals to obtain the switching power consumption of the graphics processor, wherein one of the intervals corresponds to one of the operating voltages and one of the operating frequencies.

5. The power consumption prediction method as claimed in claim 4, wherein the step of obtaining the leakage power consumption of the graphics processor comprises:

respectively obtaining the leakage power consumption generated within each of the intervals; and summing up the leakage power consumption corresponding to all of the intervals to obtain the leakage power consumption of the graphics processor.

6. The power consumption prediction method as claimed in claim 2, wherein the switching power consumption data comprises a switching power consumption per gate pre transition and a unit voltage, the switching power consumption per gate pre transition is the switching power consumption generated by a single logic gate operated in the unit voltage for implementing turning on/off once, and the step of estimating the switching power consumption according to the switching power consumption data comprises:

calculating the switching power consumption under the logic gate toggle situation according to the switching power consumption per gate pre transition.

7. The power consumption prediction method as claimed in claim 3, wherein the graphics processor comprises a plurality of hardware modules, and the switching power consumption data comprises the switching power consumption data of each of the hardware modules.

8. The power consumption prediction method as claimed in claim 2, wherein the step of estimating the switching power consumption according to the switching power consumption data comprises:

estimating the switching power consumption required by the graphics processor for processing the frame in one of the intervals according to a switching power consumption formula, wherein the switching power consumption formula is:

$SP_m = \Sigma_{m=1}^{n} Load_m / T_m * Area_m * TR_m * Freq * V^2 / V_g^2 * SPPGT$ wherein $SP_m$ is switching power consumption required by all of the hardware modules contained in the graphics processor for processing the frame in an interval, n is a total number of the hardware modules in the graphics processor, m represents an $m^{th}$ hardware module, $Load_m$ is a signal toggle count on the $m^{th}$ hardware module, $T_m$ is a clock cycle number consumed by the signal toggle count on the $m^{th}$ hardware module, $Area_m$ is a logic gate number of the $m^{th}$ hardware module, $TR_m$ is a signal toggle rate of the $m^{th}$ hardware module, Freq is the operating frequency of the interval, V is the operating voltage of the interval, $V_g$ is a unit voltage, SPPGT is a switching power consumption per gate pre transition, and the switching power consumption per gate pre transition is switching power consumption of a single logic gate operated under the unit voltage for implementing toggle once.

9. The power consumption prediction method as claimed in claim 8, wherein the step of estimating the switching power consumption according to the switching power consumption formula comprises:

obtaining total power consumption of the $m^{th}$ hardware module through a power meter by means of running a sample frame in the interval, so as to obtain a toggle rate of the $m^{th}$ hardware module corresponding to the interval.

10. The power consumption prediction method as claimed in claim 2, wherein the step of obtaining the leakage power consumption of the graphics processor comprises:

measuring the leakage power consumption of the graphics processor under the operating voltage and the operating frequency through a power meter.

11. A computing device, comprising:

a processor, obtaining leakage power consumption of a graphics processor, obtaining switching power consumption data corresponding to the graphics processor running one frame, estimating switching power consumption according to the switching power consumption data, and obtaining overall power consumption of the graphics processor according to the leakage power consumption and the switching power consumption.

12. The computing device as claimed in claim 11, wherein the processor estimates a logic gate toggle situation reflected by the graphics processor running the frame under an operating voltage and an operating frequency according to a switching power consumption data, so as to obtain the switching power consumption.

13. The computing device as claimed in claim 12, wherein the switching power consumption data comprises a signal toggle rate of the graphics processor, a logic gate number of the graphics processor, and a signal toggle count of the graphics processor, and the logic gate toggle situation refers to a toggle situation that the logic gates of the logic gate number implement the signal toggle count times of turning on/off with the toggle rate.

14. The computing device as claimed in claim 12, wherein the processor marks off a plurality of intervals according to the operating voltages and the operating frequencies, respectively calculates switching power consumption generated by corresponding logic gate toggle situation within each of the intervals, and sums the switching power consumption generated by the corresponding logic gate toggle situations of all of the intervals to obtain the switching power consumption of the graphics processor, wherein one of the operating voltages and one of the operating frequency correspond to one of the intervals.

15. The computing device as claimed in claim 14, wherein the processor respectively obtains the leakage power consumption generated within each of the intervals and sums the leakage power consumption corresponding to all of the intervals to obtain the leakage power consumption of the graphics processor.

16. The computing device as claimed in claim 12, wherein the switching power consumption data comprises a switching power consumption per gate pre transition and a unit voltage, the switching power consumption per gate pre transition is the switching power consumption generated by a single logic gate operated under the unit voltage for implementing turning on/off once, and the processor calculates the switching power consumption under the logic gate toggle situation according to the switching power consumption per gate pre transition.

17. The computing device as claimed in claim 13, wherein the graphics processor comprises a plurality of hardware modules, and the switching power consumption data comprises the switching power consumption data of each of the hardware modules.

18. The computing device as claimed in claim 12, wherein the processor estimates the switching power consumption required by the graphics processor for processing the frame of image in one interval according to a switching power consumption formula, wherein the switching power consumption formula is:

$$SP_m = \Sigma_{m=1}^{n} Load_m/T_m * Area_m * TR_m * Freq * V^2/V_g^2 * SPPGT$$

wherein $SP_m$ is the switching power consumption required by all of the hardware modules contained in the graphics processor for processing the frame in an interval, n is a total number of the hardware modules in the graphics processor, m represents an $m^{th}$ hardware module, $Load_m$ is a signal toggle count on the $m^{th}$ hardware module, Tm is a clock cycle number consumed by the signal toggle count on the $m^{th}$ hardware module generated by the processor, $Area_m$ is a logic gate number of the $m^{th}$ hardware module, $TR_m$ is a signal toggle rate of the $m^{th}$ hardware module, Freq is the operating frequency of the interval, V is the operating voltage of the interval, $V_g$ is a unit voltage, SPPGT is a switching power consumption per gate pre transition, the switching power consumption per gate pre transition is the switching power consumption generated by a single logic gate operated under the unit voltage for implementing toggle once.

19. The computing device as claimed in claim 18, wherein the processor obtains total power consumption of the $m^{th}$ hardware module running a sample frame in the interval through a power meter, so as to obtain the signal toggle rate of the $m^{th}$ hardware module corresponding to the interval.

20. The computing device as claimed in claim 12, wherein the processor measures the leakage power consumption under the operating voltage and the operating frequency through a power meter.

21. A non-transitory computer-readable storage medium, storing a computer program, wherein the computer program is executed through a processor, and the steps of executing the computer program through the processor comprising:
   obtaining leakage power consumption of a graphics processor;
   obtaining switching power consumption data corresponding to the graphics processor running one frame;
   estimating switching power consumption according to the switching power consumption information; and
   obtaining overall power consumption of the graphics processor according to the leakage power consumption and the switching power consumption.

* * * * *